June 2, 1970 A. V. POWELL 3,515,973
CONSTANT POWER SOURCE PERIODICALLY ENERGIZED LOADS
Filed Sept. 1, 1967
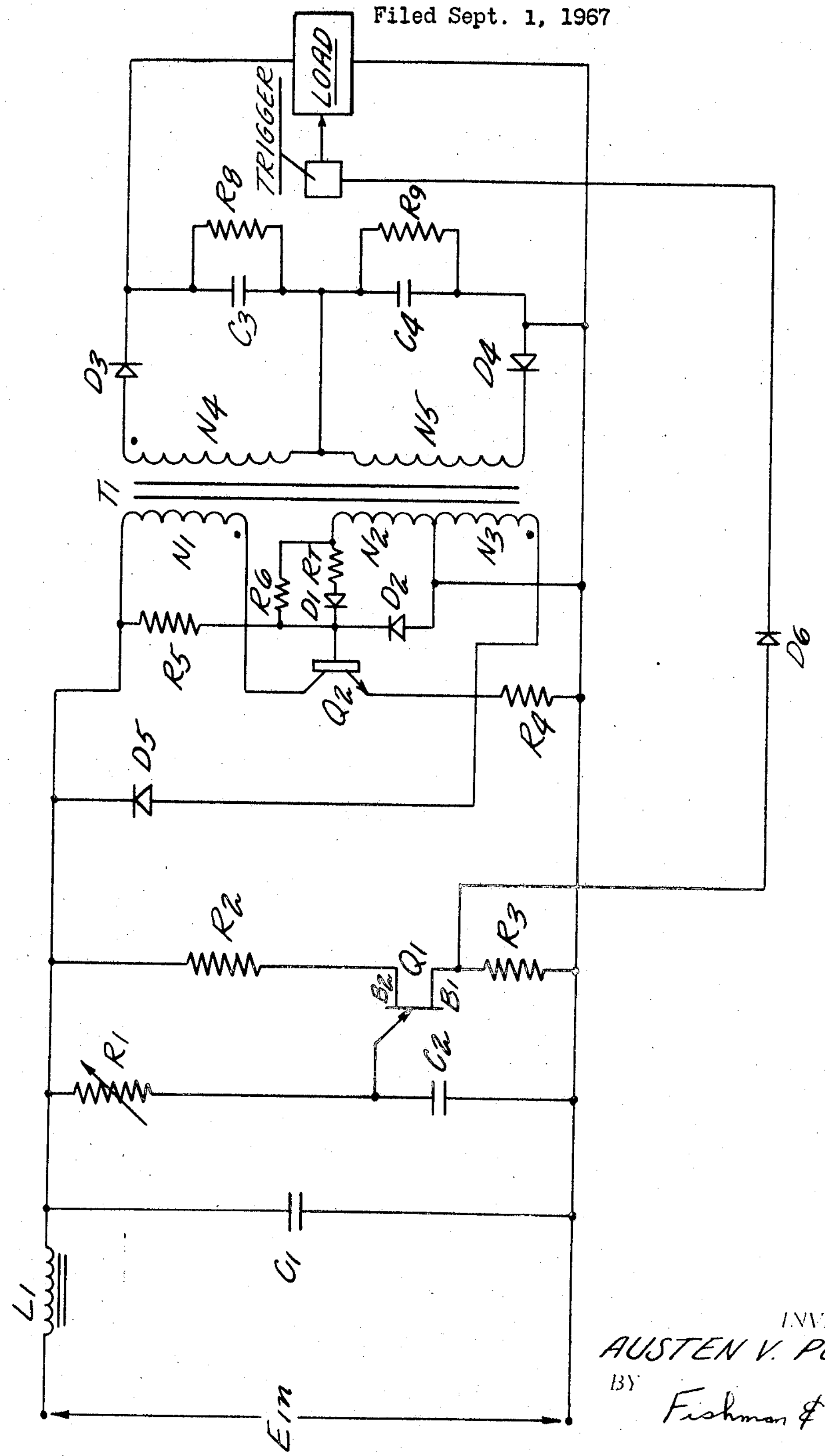
INVENTOR.
AUSTEN V. POWELL
BY
Fishman & Van Kirk
ATTORNEYS United States Patent Office 3,515,973
Patented June 2, 1970

3,515,973
CONSTANT POWER SOURCE PERIODICALLY ENERGIZED LOADS

Austen V. Powell, Deep River, Conn., assignor to Austin Electronics, Inc., Deep River, Conn., a corporation of Connecticut Filed Sept. 1, 1967, Ser. No. 665,121
Int. Cl. H02m 3/06
U.S. Cl. 320—1 14 Claims

ABSTRACT OF THE DISCLOSURE

A power source for supplying constant output power to a periodically operated load, the source employing a ring choke static inverter to provide, from a direct current supply, alternating current to the load via a diode. Operation of the inverter results in modulation of the direct current supply voltage at the frequency of conversion. A timing circuit comprising a unijunction transistor is connected across the direct current supply and the modulation of the supply voltage aids in triggering the unijunction transistor at the proper time, triggering of the unijunction transistor causing generation of a load operation command pulse.

BACKGROUND OF THE INVENTION

Field of the invention

The present invention relates to the supplying of power to an intermittently energized load. More particularly, the present invention relates to apparatus for charging a capacitor subject to periodic discharge. Accordingly, the general objects of the present invention are to provide new and improved methods and apparatus of such character.

Description of the prior art

While not limited thereto in its utility, the present invention is particularly well suited for use as a power source for welding and electrical discharge machining apparatuses, and to furnish power for laser exciters and gaseous discharge tubes. The aforementioned equipments, when triggered, present a low impedance to the power source. Thus, energy is best transferred to these equipments from a capacitive energy source. Circuitry which provides for the recharging of a capacitor after periodic discharge is known in the art. These prior art power supply circuits have, however, been possessed of certain inherent disadvantages.

One of the deficiencies of prior art power supplies employed for the charging of load capacitors was an excessive energy loss, the energy loss manifesting itself as heat which has to be dissipated. The necessity of providing suitable heat sinks, of course, contributed to space and weight problems where these characteristics were of interest. The excessive energy loss is a direct and inherent result of the fact that it has been standard practice to charge a capacitor from either a constant current source or from a constant voltage source via a resistor. In both instances, the amount of energy supplied to the capacitor results in an equal amount of energy lost in either the current source or the series limiting resistor.

It has been proposed to charge an energy storage capacitor through use of a push-pull type converter of the Royer or Jensen type used in conjunction with a suitable rectifier arrangement. However, since one of the characteristics of a Royer or Jensen inverter is a low output impedance, this technique is equivalent to the charging of the capacitor from a voltage source via an impedance. Also, as an added difficulty, if the effective limiting impedance is low, it becomes difficult to keep the switching transistors in the saturated mode since there will effectively be a short circuit across the inverter after the capacitor has been completely discharged. If the load is a gaseous discharge device, the continuous supplying of power by the inverter coupled with the low limiting impedance may result in an inability of the device to deionize.

The aforementioned power loss and operational mode problems may be overcome by employing the inherent high output impedance of a ringing choke type inverter for charging the energy storage capacitor. However, in the past problems have been encountered in initiating oscillation of a ringing choke circuit. Also, as the voltage across the energy storage capacitor builds up with each subsequent cycle of the inverter, there is a danger of reverse breakdown of the base-emitter diode of the power transistor. This is caused by the positive feedback transformer winding connected between the base and emitter of the power transistor in the ringing choke inverter.

In many applications an RFI problem is present. That is, if the energy storage capacitor is to be discharged through a device such as a beacon lamp, the circuitry for charging the capacitor must not feed RFI onto the power supply and associated conductors.

Regardless of how the energy storage capacitor is charged, means must be provided to avoid overcharging and to gate the device which permits discharge of the capacitor at the proper time. As a general rule, the prior art circuits for initiating discharge of the energy storage capacitor have not been integral with the apparatus for charging the capacitor.

SUMMARY OF THE INVENTION

The present invention comprises a method of and apparatus for recharging a capacitor after periodic discharge, which method and apparatus overcome the aforementioned disadvantages of the prior art. Apparatus for practicing the present invention comprises a ringing choke type static inverter which, from a direct current source, applies alternating current via a diode to an energy storage capacitor. Integral with the apparatus and operatively connected to the ringing choke inverter is a timing circuit which initiates the discharge of the energy storage capacitor. This timing circuit includes a sawtooth voltage generator and a unijunction transistor. A filter including a shunt capacitor prevents RFI from being fed back along the power lines to the main power source. The timing circuit is connected in parallel with the filter shunt capacitor such that the ripple caused by oscillation of the inverter, which ripple will appear at the load side of the filter, will be applied to the unijunction transistor. The ripple voltage, in combination with the generated sawtooth voltage, will fire the unijunction transistor and the capacitor in the sawtooth voltage generator will be discharged thereby generating a pulse for initiating the discharge of the energy storage capacitor. In order to prevent overcharging, means are provided for pumping energy back toward the source when the energy storage capacitor is charged to the desired point.

BRIEF DESCRIPTION OF THE DRAWING

The present invention may be better understood and its numerous advantages will become apparent to those skilled in the art by reference to the accompanying drawing in which:

The figure is a schematic diagram of a preferred embodiment of the present invention.

DESCRIPTION OF THE PREFERRED EMBODIMENT

Referring now to the figure, a preferred embodiment of the present invention is shown as being connected across a DC voltage source, not shown, which supplies E*in*. The invention comprises an input filter which, in the disclosed embodiment, comprises a series inductor L1 and a shunt capacitor C1. Connected in parallel with shunt capacitor C1 is a sawtooth voltage generator comprising variable resistance R1 and charging capacitor C2. For the reason to be explained below, the time constant of the sawtooth voltage generator circuit comprising resistance R1 and capacitor C2 is long when compared to the frequency of oscillation of the inverter which supplies the charging current to the energy storage capacitor.

Resistance R1 and capacitor C2 cooperate with a unijunction transistor Q1 and series resistors R3 and R4 to form a timing circuit. A junction between capacitor C2 and resistance R1 is connected to the emitter of unijunction transistor Q1 and thus, when the unijunction transistor fires, capacitor C2 is discharged into resistor R3. R3 thus provides an output pulse source. Resistor R2, which is connected to base B2 of the unijunction transistor Q1, effects a degree of temperature compensation.

Also connected in parallel with shunt capacitor C1 is a ringing choke type static inverter comprising transformer T1 and power transistor Q2. The collector of power transistor Q2 is connected to the direct current source via series connected primary winding N1 of transformer T1. The emitter of transistor Q2 is connected to the other side of the direct current source via resistor R4. A starting circuit for initiating oscillation of the inverter is comprised of a voltage divider consisting of resistors R5 and R6. Series connected resistor R7 and diode D1 are connected in parallel with resistor R6. The cathode of diode D1 and the junction of resistors R5 and R6 are connected to the base of transistor Q2. A diode D2 prevents excess reverse base voltage, diode D2 being connected between the base of transistor Q2 and the side of the power supply to which the emitter is connected via resistor R4.

Alternating current induced in the secondary winding of transformer T1 is coupled, via diodes D3 and D4, to the energy storage capacitor. While a single capacitor could be employed, a pair of series connected capacitors C3 and C4 are shown in the figure. For many operations economics and the application dictate that an electrolytic capacitor be used as the energy storage capacitor and, as is well known, the ESR of a low voltage electrolytic capacitor is much smaller than that of a high voltage capacitor. Accordingly, to minimize self heating, it is preferred that the energy storage capacitor be comprised of a plurality of lower voltage electrolytic capacitors connected in series. Resistors R8 and R9 are respectively connected in parallel with capacitors C3 and C4. Resistors R8 and R9 permit discharge of capacitors C3 and C4 if the load is inadvertently disconnected. The center tap of the secondary winding of transformer T1 is connected to the junction between capacitors C3 and C4 thus insuring equal voltages across the capacitors. The intermittently operated load is connected across the series connected capacitors.

The power supply of the present invention also comprises a normally reverse biased diode D5 connected between the load side of series inductor L1 and one end of clamp winding N3 of transformer T1. The purpose of diode D5 will be described below. In some instances it may also be desirable to connect a further diode D6 between base B1 of unijunction transistor Q1 and a trigger circuit which, in response to the firing of the unijunction transistor, energizes the load so that capacitors C3 and C4 may discharge therethrough. Diode D6 thus serves to isolate the trigger circuit from the timing circuit.

The operation of the circuit described above is as follows: Upon the application of power, oscillation of the inverter is initiated. In order to start the ringing choke inverter, power transistor Q2 must be biased into the linear region. While this might be accomplished merely by use of the voltage divider comprising resistors R5 and R6, such a biasing scheme is wasteful of power since the value of R6 must be sufficiently low to supply adequate base current and the value of R5 must also be low. Also when transistor Q2 has a low emitter to base voltage, excess collector current flows when oscillations are inhibited in any way. Therefore, the biasing of power transistor Q2 is accomplished by a high impedance source consisting of the voltage divider R5–R6, and the diode-resistor network (D1–R7) connected in parallel with resistor R6 supplies the requisite base current. Restated, the voltage divider causes the power transistor Q2 to be biased into the linear region and once regeneration occurs the necessary base drive is supplied via resistor R7 through diode D1. As noted above, diode D2 prevents excess reverse base voltage.

When voltage is applied to the circuit, resistors R5 and R6 bias power transistor Q2 into the active region. Primary windings N1 and N2 of transformer T1 are polarized so that positive feedback takes place. Accordingly, power transistor Q2 is driven into the saturated state with the necessary base current being supplied by the voltage induced in winding N2 via resistor R7 and diode D1.

When power transistor Q2 conducts, a voltage will be impressed across primary winding N1 of transformer T1 and linearly increasing current will flow therethrough. This current produces a voltage across emitter resistor R4 which subtracts from the voltage across primary winding N2. Accordingly, at some time $t_1$, there will be insufficient base current to support the increasing collector current and, in the manner well known in the art, power transistor Q2 can no longer remain saturated and rapid turnoff of transistor Q2 takes place.

Upon the rapid shutoff of power transistor Q2, the stored energy in primary winding N1 of transformer T1 induces a voltage in the center-tapped secondary winding N4–N5 which forward biases diodes D3 and D4. Conduction of diodes D3 and D4 permits the transfer of energy stored in the primary to the secondary winding of transformer T1 and capacitors C3 and C4 begin to charge or, if already partially charged, receive further charge. After some time $t_2$, the current in the secondary winding of transformer T1 falls to zero, power transistor Q2 is biased back on and the cycle repeats.

During the transfer of energy from the primary to secondary winding of transformer T1, the voltage induced in primary winding N2 back biases power transistor Q2. When the energy storage capacitors C3 and C4 are almost at a state of complete discharge, the voltage for back biasing power transistor Q2 is also low and a high degree of feedback is necessary. However, as the voltage across series connected storage capacitors C3 and C4 builds up with subsequent cycles, the voltage across primary winding N2 increases. This increasing voltage dictates the inclusion of diode D2 for the purpose of limiting the reverse base voltage applied to power transistor Q2.

When the voltage across storage capacitors C3 and C4 reaches $N \times E$ (N being the turns ratio of transformer T1), the bias voltage induced in clamp winding N3 of transformer T1 will be great enough to forward bias diode D5. Thus, when energy storage capacitors C3 and C4 are charged to $N \times E$ volts diode D5 will conduct during the "off" (energy transfer) time of power transistor Q2 thereby preventing further transfer of energy to storage capacitors C3 and C4. When diode D5 conducts, the energy stored in the primary winding of transformer T1 during the "on" time of power transistor Q2 is "pumped back" to the source. The source, as far as the inverter is concerned, is the line filter comprising inductor L1 and shunt capacitor C1 and thus the return of energy to this source during the conduction of diode D5 causes the charging of shunt capacitor C1. Capacitor C1 normally undergoes charge and discharge during the conversion process and a ripple will appear on the load side of inductor L1, the ripple being at the frequency of conversion. When energy is returned to the source, the magnitude of this ripple increases substantially.

The line filter comprising series inductor L1 and shunt capacitor C1 performs the function of attenuating any high voltage transients and prevents the source voltage E*in* from being modulated by the pulsating converter current, any such modulation being apt to interfere with other equipment. In addition, as will be explained below, the ripple voltage across capacitor C1 provides a sequence of sampling pulses for interrogating base B2 of unijunction transistor Q1.

As the energy storage capacitors C3 and C4 are charging up during a plurality of cycles of the inverter, capacitor C2 in the sawtooth voltage generator is charging exponentially. The time constant of the RC circuit or rate at which capacitor C2 charges is, of course, determined by the setting of variable resistance R1. The voltage across capacitor C2 is applied to the emitter of unijunction transistor Q1. A characteristic of a unijunction transistor is that when the emitter voltage reaches some fraction of the supply voltage, the impedance between the emitter and base B1 drops to a low value and current can flow between the emitter and base. By adjustment of the time constant of the sawtooth generator, the pumping back of energy to the source may be caused to occur before the charge on capacitor C2 is sufficient to trigger unijunction transistor Q1. The ripple in the source voltage is applied via resistor R2 to base B2 of unijunction transistor Q1.

When unijunction Q1 conducts, capacitor C2 discharges into resistor R3 and a pulse is generated, the pulse voltage being measured across resistor R3. Capacitor C2 will then recharge and the cycle repeats. For most purposes, it is desirable that the pulse repetition rate be at a constant frequency and for many applications this frequency must be relatively low. For example, for strobe lights pulse repetition rates on the order of one pulse per second are typical. For such low frequencies, the values of R1 and C2 must be large. However, R1 must be capable of supplying enough current to permit the unijunction transistor Q1 to trigger. This imposes an upper limit on the value of R1 for a given charging rate for capacitor C2. Economics dictate that capacitor C2 be an electrolytic type and since values on the order of 2–10 microfarads are involved, the leakage current of capacitor C2 would ordinarily lead to lack of precision. However, R1 may be large if capacitor C2 can be made to supply the trigger current. This is accomplished by periodically lowering the base B2 voltage of unijunction transistor Q1. In accordance with the present invention, and as noted above, the base B2 voltage is modulated by the source ripple voltage. Each time the charge on capacitor C2 reaches a value slightly less than that needed to trigger unijunction transistor Q1, the B2 base voltage is lowered by virtue of the source voltage being modulated by the inverter, and the unijunction transistor is triggered. Once triggered, the discharge of capacitor C2 will supply the necessary trigger current for Q1. As an added advantage, by subjecting base B2 to modulation at the frequency of conversion, high values of R1 may be used in conjunction with low values of C2 and the smaller size capacitors are available in types which exhibit little leakage. Accordingly, pulses may be generated at a stable low frequency.

In some cases the discharge path of energy storage capacitors C3 and C4 is physically very long and thus the side of the load which is directly connected to one side of the source voltage can become positive due to the flow of discharge current. Typically a device such as a silicon controlled rectifier is located near the load for triggering action and its gate to cathode rating would be exceeded by the positive voltage pulse developed across the resistance of the connecting lead. Diode D6 isolates the trigger device from the timing circuit and thus prevents the gate of the SCR from being constrained to the base B1 voltage.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. Apparatus for charging a capacitor subject to periodic discharge comprising:

a source of direct current;

means electrically connected to said current source for converting direct current supplied therefrom to alternating current, said converting means modulating the source voltage at the frequency of conversion;

means responsive to the alternating current produced by said converting means for coupling current pulses of a first polarity to an energy storage capacitor;

means for generating a bias voltage which increases with time; and means connected to said source and responsive to said bias voltage and to the modulation of said source voltage for initiating periodic discharge of the energy storage capacitor.

2. The apparatus of claim 1 wherein the means for initiating discharge of the energy storage capacitor comprises:

a pulse generator connected to said direct current source and to said bias voltage generator, said bias voltage and the modulation of said source voltage cooperating to trigger said pulse generator; and means responsive to the triggering of said pulse generator for establishing a discharge path for the energy storage capacitor.

3. The apparatus of claim 2 wherein the pulse generator comprises:

a unijunction transistor, the bases of said transistor being respectfully electrically connected to opposite polarity terminals of said direct current source, the emitter of said transistor being electrically connected to said bias voltage generator.

4. The apparatus of claim 1 wherein the converting means comprises a ringing choke inverter.

5. The apparatus of claim 4 wherein said inverter comprises:

a power transistor;

a transformer having at least a secondary winding and first and second primary windings, said secondary winding being electrically connected to said means for coupling first polarity current pulses to an energy storage capacitor, said first primary winding having one end connected to a first polarity terminal of said source and the other end connected to said power transistor, a first point on the second of said primary windings being electrically connected to the second polarity terminal of said source;

voltage divider means connected between said first polarity terminal of said source and a second point on the second of said primary windings, an intermediate point on said voltage divider being connected to the base of said power transistor; and means connected between said second of said primary windings and the base of said power transistor for providing a low impedance path for base current for said power transistor, said low impedance path providing means essentially bypassing a portion of said voltage divider means when said power transistor is in a conductive state.

6. The apparatus of claim 5 wherein said low impedance path providing means comprises;

a diode, a resistance element, said diode and resistance element being connected in series between said base of said power transistor and said second point on the second of said primary windings.

7. The apparatus of claim 1 further comprising:

means connected between said direct current source and said converting means for preventing overcharging of an energy storage capacitor connected to said pulse coupling means.

8. The apparatus of claim 3 further comprising:

means connected between said direct current source and said converting means for preventing overcharging of an energy storage capacitor connected to said pulse coupling means.

9. The apparatus of claim 6 wherein the means for initiating discharge of the energy storage capacitor comprises:

a pulse generator connected to said direct current source and to said bias voltage generator, said bias voltage and the modulation of said source voltage cooperating to trigger said pulse generator; and means responsive to the triggering of said pulse generator for establishing a discharge path for the energy storage capacitor.

10. The apparatus of claim 9 wherein the pulse generator comprises:

a unijunction transistor, the bases of said transistor being respectfully electrically connected to opposite polarity terminals of said direct current source, the emitter of said transistor being electrically connected to said bias voltage generator.

11. The apparatus of claim 6 further comprising:

means connected between a third point on said second of said primary windings and said first polarity terminal of said direct current source for preventing overcharging of an energy storage capacitor connected to said pulse coupling means.

12. The apparatus of claim 10 further comprising:

means connected between a third point on said second of said primary windings and said first polarity terminal of said direct current source for preventing overcharging of an energy storage capacitor connected to said pulse coupling means.

13. The apparatus of claim 12 wherein said first point on said second of said transformer primary windings is intermediate said second and third points and wherein said means for preventing overcharging comprises:

diode means connected between said third point on said second primary winding and the first polarity terminal of said direct current source.

14. A constant power source comprising:

a ringing choke inverter for converting direct current supplied thereto to alternating current, oscillation of said inverter continuously modulating the current supply voltage at the frequency of conversion;

an energy storage capacitor;

means connected between said inverter and said capacitor for coupling current pulses of a first polarity from the inverter to the capacitor;

means for connecting a load across said capacitor; and timing circuit means connected in parallel with the input to said inverter for periodically initiating the discharge of said capacitor into a load;

wherein said timing circuit means comprises;

means for generating a bias voltage which increases with time;

pulse generator means connected in parallel with said inverter and being responsive to said bias voltage and the modulation of the supply voltage; and means responsive to periodic pulses provided by said pulse generator means for establishing a discharge path for said capacitor, the pulses provided by said pulse generator means also resetting said bias voltage generator.

References Cited

UNITED STATES PATENTS

| | | | |
|---|---|---|---|
| 2,877,385 | 3/1959 | Rock | 320—1 X |
| 2,946,924 | 7/1960 | Gerlach | 320—1 X |
| 3,241,555 | 3/1966 | Caywood | 320—1 X |
| 3,417,306 | 12/1968 | Knak | 320—1 |

TERRELL W. FEARS, Primary Examiner

H. L. BERNSTEIN, Assistant Examiner

U.S. Cl. X.R.

219—113; 321—15, 18